(12) United States Patent
DeFelice et al.

(10) Patent No.: US 10,556,828 B2
(45) Date of Patent: *Feb. 11, 2020

(54) METHOD OF SIZING OF FIBERS AND ARTICLES MANUFACTURED FROM THE SAME

(71) Applicant: Oxford Performance Materials, Inc., South Windsor, CT (US)

(72) Inventors: Scott DeFelice, Holyoke, MA (US); Anthony DeCarmine, Lebanon, CT (US)

(73) Assignee: Oxford Performance Materials, Inc., South Windsor, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,528

(22) Filed: Jun. 28, 2019

(65) Prior Publication Data
US 2019/0322579 A1 Oct. 24, 2019

Related U.S. Application Data

(63) Continuation of application No. 14/438,171, filed as application No. PCT/US2013/066808 on Oct. 25, 2013, now Pat. No. 10,377,666.

(60) Provisional application No. 61/718,324, filed on Oct. 25, 2012.

(51) Int. Cl.
| | |
|---|---|
| C03C 25/32 | (2018.01) |
| D02G 3/36 | (2006.01) |
| C03C 25/16 | (2006.01) |
| C08J 5/06 | (2006.01) |
| D06B 23/06 | (2006.01) |
| D06M 15/53 | (2006.01) |
| C08K 9/08 | (2006.01) |

(52) U.S. Cl.
CPC ............ *C03C 25/32* (2013.01); *C03C 25/16* (2013.01); *C08J 5/06* (2013.01); *C08K 9/08* (2013.01); *D02G 3/36* (2013.01); *D06B 23/06* (2013.01); *D06M 15/53* (2013.01); *D10B 2101/06* (2013.01); *Y10T 428/2964* (2015.01)

(58) Field of Classification Search
CPC . C03C 25/32; C03C 25/16; C08J 5/06; C08K 9/08; D02G 3/36; D06B 23/06; D06M 15/53; Y10T 428/2964; D10B 2101/06
See application file for complete search history.

(56) References Cited

U.S. PATENT DOCUMENTS

| | | | |
|---|---|---|---|
| 4,783,349 | A | 11/1988 | Cogswell et al. |
| 4,990,252 | A | 2/1991 | Tomaschke et al. |
| 5,089,192 | A | 2/1992 | Costa |
| 5,409,757 | A | 4/1995 | Muzzy et al. |
| 2004/0131910 | A1 | 7/2004 | Bauer |
| 2011/0224399 | A1 | 9/2011 | Louis et al. |
| 2011/0294943 | A1 | 12/2011 | Bertelo et al. |
| 2015/0274588 | A1 | 10/2015 | DeFelice et al. |

FOREIGN PATENT DOCUMENTS

WO      2013092628 A1    6/2013

OTHER PUBLICATIONS

European Office Action Application No. 13849931.4 dated May 3, 2017 4 Pages.
Extended European Search Report Application No. 13849931.4 dated May 2, 2016 Completed: Apr. 18, 2016 5 Pages.
Extended European Search Report Application No. 18188614.4 Completed: Dec. 5, 2018; dated Dec. 13, 2018 8 Pages.
International Search Report & Written Opinion of the International Searching Authority Application No. PCT/2013/066808 Completed: Jan. 31, 2014; dated Feb. 24, 2014 7 pages.
Sherman et al. "Solvent Replacement for Green Processing" Environmental Health Perspectives vol. 106 Supplement 1. (Year:1998).
Swier et al. "Sulfonated Poly(ether ketone ketone) Ionomers as Proton Exchange Membranes" Polymer Engineering & Science vol. 45 Issue 8, 2005, pp. 1081-1091.
U.S. Office Action U.S. Appl. No. 14/438,171 dated Apr. 25, 2017 10 pages.
U.S. Office Action U.S. Appl. No. 14/438,171 dated May 1, 2018 11 pages.
U.S. Office Action U.S. Appl. No. 14/438,171 dated Oct. 13, 2017 11 pages.
U.S. Office Action U.S. Appl. No. 14/438,171 dated Nov. 26, 2018 10 Pages.

*Primary Examiner* — Robert S Walters, Jr.
(74) *Attorney, Agent, or Firm* — Whitmyer IP Group LLC

(57) ABSTRACT

The method includes the steps of functionalizing a polyaryletherketone (PAEK) polymer, and blending the PAEK polymer with water to form a sizing composition. The method may further include the step of applying the sizing composition to a fiber. The method may further include the step of heating the fibers, coated with sizing composition, for example to between 300° C.-400° C. In some methods, the functionalized PAEK polymer comprises functionalized polyetherketoneketone (PEKK). In yet other methods, the functionalized PAEK polymer comprises sulfonated PEKK (sPEKK).

19 Claims, No Drawings

मेटHOD OF SIZING OF FIBERS AND ARTICLES MANUFACTURED FROM THE SAME

FIELD OF THE INVENTION

The present invention relates to a method of sizing fibers and articles manufactured from the same. More specifically, the present invention relates to a method of applying a functionalized PAEK polymer coating to a fiber.

BACKGROUND OF THE INVENTION

It is known to apply various chemical treatments to fibers such as glass fibers and carbon fibers to facilitate handling of the fibers, improve processability for compounding and downstream processes such as injection molding, and to improve strength and other properties for specific end-use applications. A surface treatment, which may also be referred to as a coating composition, sizing composition, or sizing material, may be applied to at least a portion of a surface of a fiber to protect it from abrasion and to assist in processing. This process of applying the surface treatment is commonly referred to as sizing.

In one known process, a sizing material is applied to a target material, for example a plurality of fibers, using a solvent. First, the sizing material is dissolved in the solvent. Next, the solvent is applied to the fibers so that the sizing material is applied to at least a portion of a surface of the fibers. After the solvent is applied to the fibers, the fibers coated with sizing material are heated to evaporate the solvent.

Polyaryletherketones (PAEK) polymers are of interest to use as sizings for fibers used as reinforcements for plastic type materials—especially those processed at higher temperatures than can be tolerated by more common sizings. A PAEK polymer powder may be from the group consisting of polyetheretherketone (PEEK), polyetherketoneketone (PEKK), polyetherketone (PEK), polyetheretherketoneketone (PEEKK) or polyetherketoneetherketoneketone (PEKEKK).

U.S. Patent Application No. 2011/0294943 (the '943 application) discloses a method of applying amorphous (i.e. non-crystalline) PAEK as a sizing composition to fibers. The '943 application recognizes that many polymeric resins, especially highly crystalline engineering thermoplastics such as crystalline PAEK, do not exhibit good adhesion to various fiber surfaces. To overcome this problem, the '943 application proposes a method of coating a fiber with amorphous PEKK. The disclosure of the '943 application is incorporated herein in its entirety.

A disadvantage of the method disclosed in the '943 application is that it requires aggressive, toxic, and potentially explosive solvents to dissolve the amorphous PAEK. The need to use such dangerous solvents greatly inhibits broader adoption and use of sizing compositions comprising amorphous PAEK. The '943 application, for example, teaches dissolving a PAEK resin using methylene chloride or concentrated sulfuric acid to create a solution for sizing a fiber. Such wetting and doctoring processes are well known and, therefore, are not detailed herein except to note that they require highly corrosive solvents that are not commonly used for reasons of safety, environment and machinery lifetime. Due to the low solubility of PAEK resins in any solvent system, this process must of necessity create copious volumes of difficult (toxic, acidic) to manage waste. As a result, such processes are expensive and dangerous, limiting their usefulness and discouraging adoption by industry.

What is desired, therefore, is to provide a system and method of applying a sizing comprising a PAEK polymer to a fiber in which a less volatile solvent, as compared to known methods, is used.

SUMMARY OF THE INVENTION

The present invention resides in one aspect in an improved method of sizing a fiber. The method includes the steps of functionalizing a PAEK polymer, and blending the PAEK polymer with water to form a sizing composition. The method may further include the step of applying the sizing composition to a fiber. The method may further include the step of heating the fibers, coated with sizing composition, for example to between 300° C.-400° C. to defunctionalized the applied coating.

In some embodiments of the present invention the step of functionalizing the PAEK polymer comprises sulfonation. In yet other embodiments of the present invention, the PAEK polymer comprises polyetherketoneketone (PEKK). In yet further embodiments of the present invention, the method includes the step of heating the applied sizing composition to evaporate the water.

In some embodiments of the present invention, the method includes the step of heating the applied sizing composition to a temperature at or above a defunctionalization temperature of the applied sizing composition. Further embodiments of the present invention include the step of heating the applied sizing composition to a temperature at or above a fusion temperature of the applied sizing composition.

In some embodiments of the present invention, the functionalized PAEK polymer is dissolved in a solvent other than water. Such solvents may include, but are not limited to, various alcohols, acetone, volatile organic oils, and other non-volatile solvents known in the art.

DETAILED DESCRIPTION OF THE INVENTION

First, a PAEK polymer is functionalized. In functionalizing the polymer, certain chemical groups are added to the basic structure of the molecule. The functionalization step alters the wetting and solubility behaviors of the polymer. For example, by functionalizing a PAEK family material, it is possible to make the material water soluble. The functionalized PAEK polymer is blended with water to form a sizing composition.

An example of a functionalization for use with the present invention includes, but is not limited to sulfonation. Sulfonation of a PAEK material results in a PAEK material that is soluble in water. It is possible to vary functionalization of the PAEK material so as to vary the solubility. In some embodiments, the functionalized PAEK material is soluble to the point of deliquescence. The functionalization step can be performed on the PAEK material after polymerization or in the synthetic path. After the PAEK material is functionalized, it is blended with water to form the sizing composition. It is possible to vary the viscosity of the sizing composition by adjusting the ratio of functionalized PAEK material to water.

In one embodiment of the present invention, amorphous PEKK is functionalized to form sPEKK. The sPEKK is blended with water to form a sizing composition. Suitable amorphous polyetherketoneketones are available from commercial sources, such as, for example, certain of the polyetherketoneketones sold under the brand name OXPEKK by Oxford Performance Materials, South Windsor, Conn., including OXPEKK-SP polyetherketoneketone. The sizing composition may additionally include components other than the sPEKK, such as stabilizers, pigments, processing aids, fillers, and the like.

The sizing composition resulting from the functionalized PAEK and the water is relatively benign and readily managed. The sizing composition may be applied to fiber or other materials using known methods and systems. The present invention is useful in connection with any type of fiber, but particularly fibers that are to be used as reinforcements or fillers in polymeric matrices. Suitable fibers include, for example, glass fibers, carbon fibers, polymeric fibers, metallic fibers, mineral (ceramic, inorganic) fibers and the like. Glass fibers (fiberglass) may be obtained from any type of glass, e.g., A glass, E glass, S glass, or D glass. Carbon fibers (which include graphite fibers) are typically prepared by pyrolysis of organic or polymeric fibers (such as PAN). Polymeric fibers include fibers made from any of the known types of thermoplastic polymers such as polyamides, polyolefins, polyaramids, polyesters, poly(p-phenylene-2,6-benzobisoxazole)(PBO), and the like. Suitable metallic fibers include fibers prepared using any type of metal or metal alloy, such as iron, steel, aluminum, aluminum alloys, copper, titanium, nickel, gold, silver and the like. Mineral fibers that can be used in the present invention are fibers made from natural or synthetic minerals, refractory oxides or metal oxides and include, but are not limited to, mineral wool, rock wool, stone wool, basalt fibers, alumina fibers, beryllia fibers, magnesia fibers, thoria fibers, zirconia fibers, silicon carbide fibers, quartz fibers, boron fibers, asbestos fibers and high silica fibers and the like.

Fibers of any diameter or length may be sized with a coating of functionalized PAEK and water in accordance with the present invention. For example, the fiber may be from 1 micron to 1 mm in diameter. Typically, the fiber is many times longer than its diameter. For example, the fiber length may be at least 10, 100, 1000 or 10,000 times the fiber diameter.

After an application is applied, it is heated. Sufficient heat is applied so that the sizing composition dries and creates a solid layer on at least a portion of a surface of the fiber. At this point, the applied sizing composition is still water soluble as before the application because the applied PAEK is functionalized. The applied PAEK preferably forms a relatively thin coating on the fiber surface. For example, the coating may be from about 1 to about 50 microns thick. In one embodiment of the invention, the fiber surfaces are completely covered by the coating, although in other embodiments certain portions of the fiber surfaces remain uncoated. Typically, the coating may comprise from about 0.01 to about 10% by weight of the sized fibers.

Some embodiments of the present invention include the step of heating the applied sizing composition to a temperature at or above the defunctionalization temperature of the PAEK polymer, for example in reference to sPEKK to between 300° C.-400° C. This heating causes the functional groups to detach from the PAEK polymer, resulting in an applied sizing composition that is less water soluble. In this way, it is possible to recover the desirable solvent resistant behaviors in the original polymer after it has been applied to the fiber.

In some embodiments, the applied sizing composition is heated to a temperature at or above the fusion point of the PAEK polymer, thereby enhancing the bonds of certain systems.

Means for applying the sizing composition include, but are not limited to, pads, sprayers, rollers or immersion baths, which allow a substantial amount of the surfaces of the individual filaments of the fiber to be wetted with the sizing composition. The sizing composition may be applied to the fibers by dipping, spraying, roll coating, extruding, pultrusion, or the like. In one embodiment, the sizing composition is applied to the fibers continuously.

In one embodiment of the invention, chopped fibers sized in accordance with the present invention may be mixed with a polymeric resin and supplied to a compression- or injection-molding machine to be formed into fiber-reinforced composites. Typically, the chopped fibers are mixed with pellets of a thermoplastic polymer resin in an extruder. For example, polymer pellets can be fed into a first port of a twin screw extruder and the chopped sized fibers then fed into a second port of the extruder with the melted polymer to form a fiber/resin mixture. Alternatively, the polymer pellets and chopped fibers can be dry mixed and fed together into a single screw extruder where the resin is melted and the fibers are dispersed throughout the molten resin to form a fiber/resin mixture. Next, the fiber/resin mixture is degassed and formed into pellets. The fiber/resin pellets can then be fed to a molding machine and formed into molded composite articles that have a substantially homogeneous dispersion of fibers throughout the composite article.

The sized fibers of the present invention may also be used in long-fiber thermoplastic applications. Fiber-reinforced thermoplastic polymer structural components can be manufactured from long fiber thermoplastic (LFT) granulates (pellets), glass mat thermoplastic (GMT) sheets, or pultruded sections wherein the fibers have been sized with functionalized amorphous polyetherketoneketone. Long fiber-reinforced granulates can comprise sized fiber bundles encapsulated with a thermoplastic through a cable coating or a pultrusion process. The LFT granulates, which contain fibers equal in length to the pellet, e.g., 1 to 25 mm, can be injection molded, but can also be extrusion compression molded in order to preserve fiber length in the finished product.

Polymer components reinforced with sized fibers in accordance with the present invention may also be manufactured using continuous in-line extrusion methods known in the art. Such methods involve the plastication of a polymer in a first single screw extruder from which the output is fed to a second single screw extruder. Fibers are introduced in the polymer melt in the second extruder, either in chopped-segmented form or as continuous strands under a predetermined tension. The fiber-reinforced polymer is fed into an accumulator and then applied automatically or in a separate step to a compression molding tool wherein the fiber-reinforced polymer is shaped as required for a particular application. Alternatively, the fiber-reinforced polymer may be continuously extruded onto a conveyor and sectioned thereupon. The conveyor delivers the sectioned fiber-reinforced polymer to a placement assembly which removes the sectioned material from the conveyor and places the material upon the compression molding tool.

The process of compounding and molding the sized reinforcing fiber and the matrix resin to form a composite may be accomplished by any means conventionally known in the art. Such compounding and molding means include, but are not limited to, extrusion, wire coating, blow molding, compression molding, injection molding, extrusion-compression molding, extrusion-injection-compression molding, long fiber injection, and pushtrusion.

The orientation of the sized fibers within the polymeric matrix of the composite produced in accordance with the present invention may be varied and controlled as desired using the techniques known to those skilled in the field. For example, the fibers may be continuous and aligned, or discontinuous and aligned, or discontinuous and randomly oriented.

The amount of fiber included in the composite is generally about 1% to about 90% by weight, based on the total weight of the composite formulation.

The coating in accordance with the present invention improves compatibility and adhesion with the resin matrix, and results in composites with more desirable properties such as higher short-term and long-term mechanical properties.

Reinforced polymers prepared in accordance with the present invention may be use in any of the end use applications where such materials conventionally are employed or have been proposed to be employed. Representative applications include composites for aerospace/aircraft, automobiles and other vehicles, boats, machinery, heavy equipment, storage tanks, pipes, sports equipment, tools, biomedical devices (including devices to be implanted into the human body, such as load-bearing orthopedic implants), building components, and the like. Benefits of the invention described herein include higher tensile strength, higher compressive strength, improved resistance to crack initiation and propagation, greater creep resistance, and higher resistance to attack by various chemicals and solvents, as compared to reinforced polymers prepared using fibers that are not sized with a coating in accordance with the present invention.

Fiber-reinforced composites in accordance with the present invention can, for example, be used to prepare laminar panels that are stacked and bonded to each other or can be used as face sheets in the production of sandwich panels having honeycomb or foamed cores.

EXAMPLE

Example 1

PEKK resin is sulfonated in a process involving warm, concentrated sulfuric acid (>98% wt acid in water, >30° C., <5% wt polymer in acid) to yield an sPEKK (apx. 25% sulfonated) material soluble in warm water 50° C.). Using DSC it has been determined that at the sPEKK de-functionalizes at approximately 260° C. At that temperature, the acid groups are detached returning the material to PEKK. Repeat cycling shows change is permanent.

After the PEKK resin is sulfonated and dissolved in water forming the sizing composition, the sizing composition is applied to the fiber. After this application, the fiber coated with sizing composition is heated to between 300° C.-400° C., whereupon the applied PEKK is defunctionalized and fuses to the fiber surface. Such fiber tows are readily handled.

When the sPEKK was blended in water, the solvent displayed excellent wetting behavior against glass beaker walls and was well bonded to the DSC can after analysis. Dragging of glass fibers through solution resulted in easy coating, tolerant of manipulation to encourage proper infiltration into the fiber bundle. Oven drying of the applied sizing composition at 150° C. resulted in reduced thickness of the applied sizing composition however it did not impact its solubility. For example, the applied sizing composition was rinsed clean from the fibers using water at approximately 90° C. Further heat treatment to fusion of resin yielded a well bonded strand no longer water soluble even after boiling for 1 hour.

Although the present invention has been disclosed and described with reference to certain embodiments thereof, it should be noted that other variations and modifications may be made, and it is intended that the following claims cover the variations and modifications within the true scope of the invention.

What is claimed is:

1. A method of applying a sizing composition to a target material, the method comprising the steps of:
   functionalizing a polyetherketoneketone (PEKK) polymer by sulfonation to form sPEKK;
   combining the sPEKK with water to form a sizing composition;
   applying the sizing composition to the target material;
   heating the sizing composition applied to the target material to at least 150° C. to evaporate the water in the applied sizing composition,
   wherein the applied sizing composition applied to the target material is water soluble after the step of heating to evaporate.

2. The method of claim 1, further comprising the steps of:
   after the step of heating the sized fiber to at least 150° C. to evaporate the water in the applied sizing composition, a further step of heating the applied sizing composition to a temperature at or above the defunctionalization temperature of the sPEKK in the applied sizing composition.

3. The method of claim 2, wherein the step of heating to at or above the defunctionalization temperature causes functional groups to detach from the sPEKK to form a polyetherketoneketone (PEKK) applied to the target material.

4. The method of claim 3, wherein the PEKK applied to the target material is water insoluble.

5. The method of claim 4, wherein the step of heating to at or above the defunctionalization temperature comprises heating the sizing composition applied to the target material to at least 300° C.

6. The method of claim 5, further comprising the steps of:
   after the step of heating the sized fiber to at or above the defunctionalization temperature, a further step of heating the PEKK applied to the target material to a temperature at or above a fusion point of the PEKK.

7. The method of claim 1, wherein the step of combining the sPEKK with water to form a sizing composition includes adjusting a ratio of the sPEKK to the water to vary viscosity of the sizing composition.

8. The method of claim 1, wherein the step of applying the sizing composition to the target material is selected from the group consisting of dipping, spraying, roll coating, extruding, and pultrusion.

9. The method of claim 1, wherein the applied sizing composition is between 1 micron and 50 microns in thickness.

10. A method of applying a coating composition to a target material, the method comprising the steps of:
   providing a sulfonated polyetherketoneketone (sPEKK);
   blending the sPEKK with water to form a coating composition;
   applying the coating composition to a target material;

heating the coating composition applied to the target material to evaporate the water in the applied coating composition;

wherein the applied coating composition is water soluble after the step of heating to evaporate.

11. The method of claim 10, wherein the step of heating the coating composition applied to the target material comprises the step of heating the coating composition to at least 150° C.

12. The method of claim 11, further comprising the steps of:

after the step of heating the coating composition applied to the target material to evaporate the water in the applied coating composition, a further step of heating the applied coating composition to a temperature at or above the defunctionalization temperature of the sPEKK.

13. The method of claim 12, wherein the step of heating to at or above the defunctionalization temperature causes functional groups to detach from the sPEKK to form a polyetherketoneketone (PEKK) in the applied coating composition.

14. The method of claim 13, wherein the PEKK in the applied coating composition is water insoluble.

15. The method of claim 14, wherein the step of heating to at or above the defunctionalization temperature comprises heating the coating composition applied to the target material to at least 300° C.

16. The method of claim 15, further comprising the steps of:

after the step of heating the coated target material to at or above the defunctionalization temperature, a further step of heating the PEKK applied to the target material to a temperature at or above a fusion point of the PEKK.

17. The method of claim 10, wherein the step of blending the sPEKK with water to form the coating composition includes adjusting a ratio of the sPEKK to the water to vary viscosity of the coating composition.

18. The method of claim 10, wherein the step of applying the coating composition to the target material is selected from the group consisting of dipping, spraying, roll coating, extruding, and pultrusion.

19. The method of claim 10 wherein the applied coating composition is between 1 micron and 50 microns in thickness.

* * * * *